US012579121B2

(12) United States Patent　　　　　(10) Patent No.:　US 12,579,121 B2
Chen et al.　　　　　　　　　　　　　　(45) Date of Patent:　　Mar. 17, 2026

(54) MANAGEMENT OF A SECONDARY VERTEX INDEX FOR A GRAPH

(71) Applicant: GraphSQL Inc., Redwood City, CA (US)

(72) Inventors: Songting Chen, Portola Valley, CA (US); Yu Xu, Millbrae, CA (US); Dan Hu, Sunnyvale, CA (US); Zixuan Zhuang, San Jose, CA (US)

(73) Assignee: GraphSQL, Inc., Redwood City, CA (US)

( * ) Notice: Subject to any disclaimer, the term of this patent is extended or adjusted under 35 U.S.C. 154(b) by 0 days.

(21) Appl. No.: 17/220,030

(22) Filed: Apr. 1, 2021

(65) Prior Publication Data

US 2021/0216516 A1　　Jul. 15, 2021

(51) Int. Cl.
　　*G06F 16/248*　　　(2019.01)
　　*G06F 16/22*　　　　(2019.01)
　　*G06F 16/23*　　　　(2019.01)
　　*G06F 16/2455*　　　(2019.01)
　　*G06F 16/28*　　　　(2019.01)

(52) U.S. Cl.
　　CPC ...... *G06F 16/2228* (2019.01); *G06F 16/2358* (2019.01); *G06F 16/2455* (2019.01); *G06F 16/248* (2019.01); *G06F 16/287* (2019.01)

(58) Field of Classification Search
　　CPC .............. G06F 16/2228; G06F 16/287; G06F 16/2455; G06F 16/2358; G06F 16/248
　　USPC ........................................................ 707/741
　　See application file for complete search history.

(56) References Cited

U.S. PATENT DOCUMENTS

| | | | | |
|---|---|---|---|---|
| 7,970,742 B2 * | 6/2011 | Hanckel | .............. | G06F 16/2477 |
| | | | | 707/673 |
| 9,104,665 B1 * | 8/2015 | Bik | ......................... | G06F 16/00 |
| 9,275,132 B2 * | 3/2016 | Roberts | ................. | G06F 16/334 |
| 9,576,007 B1 * | 2/2017 | Sivathanu | ........... | G06F 16/2228 |
| 2002/0178341 A1 * | 11/2002 | Frank | .................. | G06F 12/0866 |
| | | | | 711/216 |
| 2005/0192986 A1 * | 9/2005 | Butler | ................... | G06F 16/288 |
| 2006/0195428 A1 * | 8/2006 | Peckover | .............. | G06F 16/951 |
| 2008/0098045 A1 * | 4/2008 | Radhakrishnan | ... | G06F 16/2477 |
| | | | | 707/999.203 |
| 2008/0281801 A1 * | 11/2008 | Larson | .................. | G06F 16/284 |
| 2009/0094236 A1 * | 4/2009 | Renkes | ................ | G06F 16/275 |
| 2009/0235314 A1 * | 9/2009 | Mito | .................. | H04N 21/4348 |
| | | | | 725/50 |
| 2010/0250598 A1 * | 9/2010 | Brauer | .................. | G06F 16/319 |
| | | | | 707/E17.071 |
| 2012/0066206 A1 * | 3/2012 | Chappell | ........... | G06F 16/24532 |
| | | | | 707/E17.131 |

(Continued)

*Primary Examiner* — Amy Ng
*Assistant Examiner* — Antonio J Caiado

(57)　　　　　　ABSTRACT

Systems, methods, and software described herein manage and use a secondary index associated with graph vertices. In one example, a graph management system may generate an index for vertices in a graph associated with an attribute type, wherein each of the vertices include a unique identifier and one or more attributes, and wherein each entry in the index associates at least one attribute value with one or more of the vertices with an attribute that qualifies for the entry. The graph management system further generates one or more delta indexes associated with the index based on modifications to the graph and generates query responses using the index and at least one of the one or more delta indexes.

18 Claims, 9 Drawing Sheets

(56) References Cited

U.S. PATENT DOCUMENTS

| | | | | |
|---|---|---|---|---|
| 2012/0110024 A1* | 5/2012 | Wei | ........................ | G06F 16/282 |
| | | | | 707/E17.055 |
| 2013/0166598 A1* | 6/2013 | Vaitheeswaran | ...... | G06F 16/256 |
| | | | | 707/792 |
| 2013/0226869 A1* | 8/2013 | Renkes | ............. | G06F 16/24557 |
| | | | | 707/625 |
| 2013/0346419 A1* | 12/2013 | Hewitt | .................... | G06F 16/31 |
| | | | | 707/746 |
| 2014/0136498 A1* | 5/2014 | Finis | ................... | G06F 16/2329 |
| | | | | 707/695 |
| 2014/0172914 A1* | 6/2014 | Elnikety | ............. | G06F 16/9024 |
| | | | | 707/774 |
| 2014/0188941 A1* | 7/2014 | Harter | ..................... | G06F 16/28 |
| | | | | 707/798 |
| 2015/0046492 A1* | 2/2015 | Balachandran | ........... | G06F 8/36 |
| | | | | 707/772 |
| 2015/0112998 A1* | 4/2015 | Shankar | .............. | G06F 16/2455 |
| | | | | 707/798 |
| 2015/0310129 A1* | 10/2015 | Ushijima | ........... | G06F 16/9024 |
| | | | | 707/798 |
| 2016/0071233 A1* | 3/2016 | Macko | .................. | G06T 11/206 |
| | | | | 345/440 |
| 2017/0147705 A1* | 5/2017 | Kasperovics | ....... | G06F 16/2433 |
| 2018/0136830 A1* | 5/2018 | Kindelsberger | ........ | G06F 16/00 |
| 2019/0310970 A1* | 10/2019 | Braghin | ............. | G06F 16/2228 |

* cited by examiner

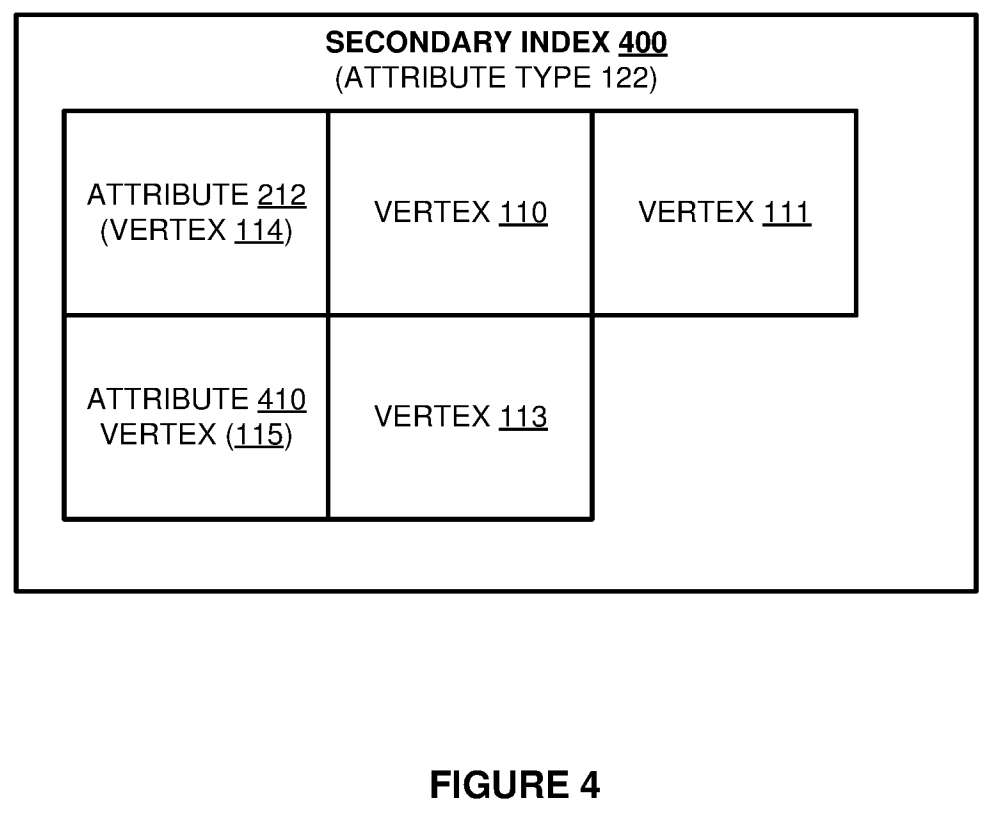

SECONDARY INDEX 400
(ATTRIBUTE TYPE 122)

| ATTRIBUTE 212 (VERTEX 114) | VERTEX 110 | VERTEX 111 |
| ATTRIBUTE 410 VERTEX (115) | VERTEX 113 | |

FIGURE 4

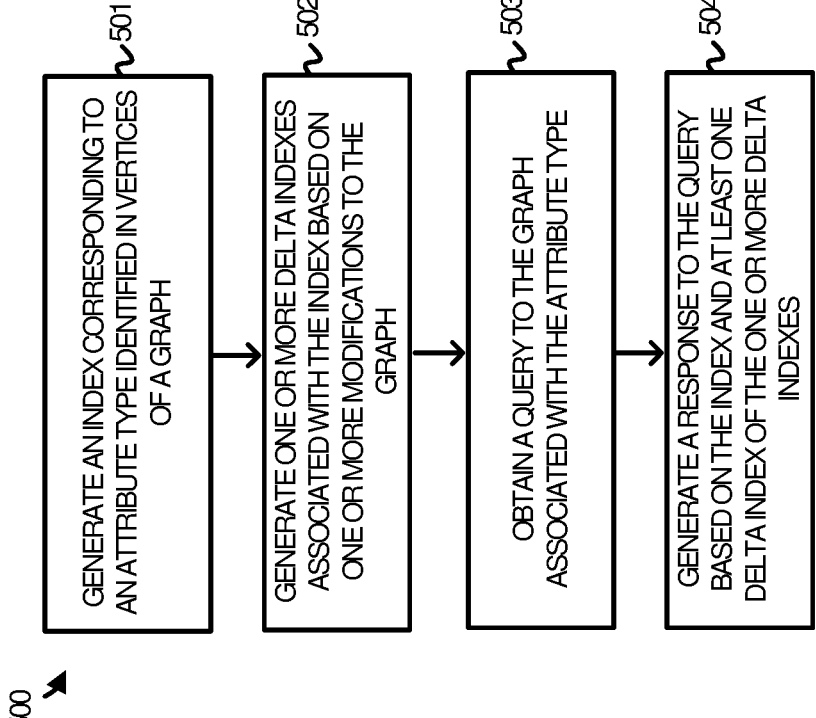

500

GENERATE AN INDEX CORRESPONDING TO AN ATTRIBUTE TYPE IDENTIFIED IN VERTICES OF A GRAPH ~501

GENERATE ONE OR MORE DELTA INDEXES ASSOCIATED WITH THE INDEX BASED ON ONE OR MORE MODIFICATIONS TO THE GRAPH ~502

OBTAIN A QUERY TO THE GRAPH ASSOCIATED WITH THE ATTRIBUTE TYPE ~503

GENERATE A RESPONSE TO THE QUERY BASED ON THE INDEX AND AT LEAST ONE DELTA INDEX OF THE ONE OR MORE DELTA INDEXES ~504

FIGURE 5

SECONDARY INDEX 400
(ATTRIBUTE TYPE 122)

| ATTRIBUTE 212 (VERTEX 114) | VERTEX 110 | VERTEX 111 |
| ATTRIBUTE 410 VERTEX (115) | VERTEX 113 | |

DELTA INDEX 610
(ATTRIBUTE TYPE 122)

| ATTRIBUTE 212 (VERTEX 114) | VERTEX 111/ DELETE/ TIME STAMP 650 |
| ATTRIBUTE 410 VERTEX (115) | VERTEX 611/ ADD/ TIME STAMP 651 |

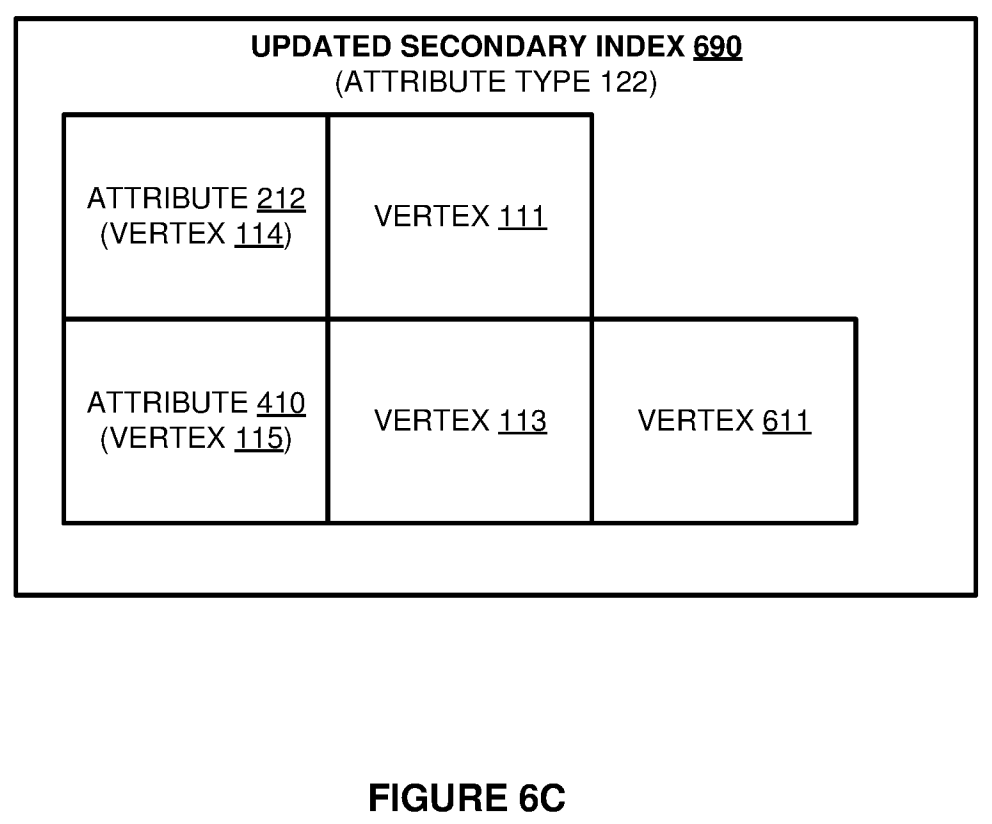

UPDATED SECONDARY INDEX 690
(ATTRIBUTE TYPE 122)

| ATTRIBUTE 212 (VERTEX 114) | VERTEX 111 | |
| ATTRIBUTE 410 (VERTEX 115) | VERTEX 113 | VERTEX 611 |

FIGURE 6C

MANAGEMENT OF A SECONDARY VERTEX INDEX FOR A GRAPH

RELATED APPLICATIONS

This application is related to and claims priority to U.S. Provisional Patent Application No. 63/003,699, entitled "MANAGEMENT OF A SECONDARY VERTEX INDEX FOR A GRAPH", filed on Apr. 1, 2020, which is incorporated by reference herein in its entirety.

BACKGROUND

Relational databases generally store data in one or more tables with rows and columns for the various data items. In contrast, graph databases represent data in the form of vertices and edges, where a vertex represents an entity or data instance, and an edge represents a relationship of some type between any two vertices. Graph database representations allow data modeling that more closely parallels the real world and provides a visual representation of connected data. In general, a graph is a set of objects, called vertices, nodes, or points, which are connected by links, called lines or edges. The edges establish relationships (connections) between the vertices. Graphs can be directed or undirected. In an undirected graph, an edge from first point to a second point is considered to be the same as a line from the second point to the first point. In a directed graph, the two directions are treated as distinct directed edges.

Although graph databases provide an efficient manner for storing data, difficulties can arise in efficiently responding to queries of the graph. In particular, as graphs expand with a greater quantity of vertices and edges, queries to the graphs may consume additional processing and time resources to search the graph and respond to the queries. These difficulties are often compounded when each of the vertices includes multiple searchable attributes, such as names, ages, birthdays, or other similar attributes, requiring a system to traverse the vertices of the graph to identify vertices (or edges) with a relevant attribute.

Overview

Provided herein are systems and methods to manage a secondary graph index and use the graph index to respond to queries of a graph. In one implementation, a graph management system generates an index corresponding to attributes of an attribute type identified in vertices of a graph, wherein the vertices comprise a unique identifier and one or more attributes corresponding to one or more attribute types, and wherein each entry in the index associates at least one attribute value with one or more of the vertices with an attribute that qualifies for the entry. The graph management system further generates one or more delta indexes associated with the index based on one or more modifications to the graph, obtains a query to the graph associated with the attribute type, and generates a response to the query based on the index and at least one delta index of the one or more delta indexes.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a secondary index for a graph according to an implementation.

FIG. 5 illustrates an operation of a graph management system to maintain a secondary index according to an implementation.

FIGS. 6A-6C illustrate modifications in a graph and a secondary index according to an implementation.

DETAILED DESCRIPTION

Figure 1:
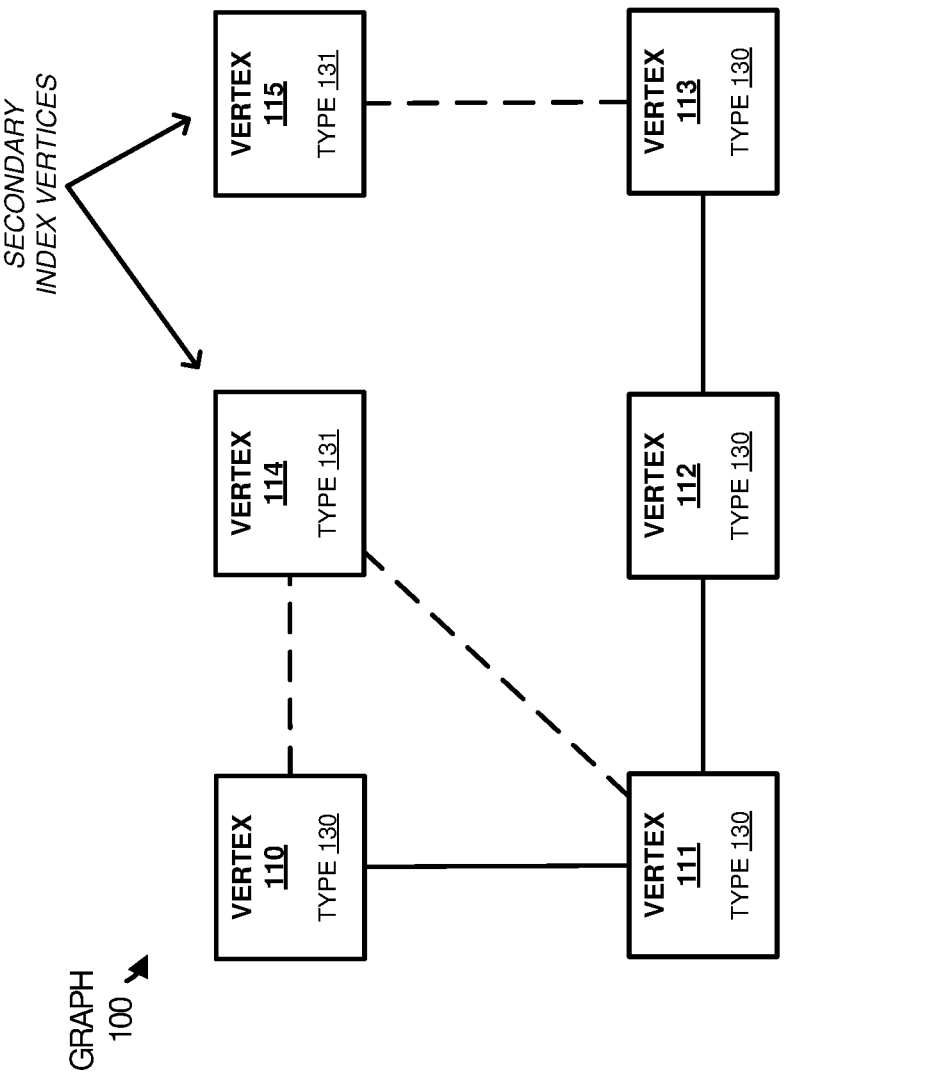
FIG. 1 illustrates a graph with secondary index vertices according to an implementation.

Examples herein provide operations manage a secondary graph index and use the secondary graph index to respond to queries of a graph. In one implementation, a graph management system may maintain a graph that includes a plurality of vertices and a plurality of edges that are used to define relationships between the plurality of vertices. In some implementations, a graph may include vertices of various types, wherein a first vertex type may correspond to data instances (referred to herein as data instance vertices) that comprise a unique identifier and one or more attributes. These attributes may comprise numerical values, descriptive information for the data instance, or some other attribute for the data instance. As an example, a graph of a social network may include data instance vertices that correspond to users of the social network. Each of the data instance vertices may include a unique identifier associated with the user, which may be used for a primary index, the age of the user, the location of the user, or some other attribute of the user.

In some implementations, in addition to the data instance vertices, additional vertices may be added to the graph that can be used to provide indexing based on different attributes of the data instances. Referring again to the social network example, data instance vertices representing users may be indexed using a unique identifier for the individual user. However, additional vertices may be added to the graph, referred to as index vertices, that can be used to index the users based on attributes other than the unique identifiers. These attributes may include age, location, occupation, or some other attribute of the user. Thus, rather than using a single index, such as unique identifiers, to search the data instances of the graph, index vertices may permit the graph to be indexed using multiple attributes of the data instances. In some examples, the index vertices may be explicitly added to a graph with the data instance vertices, however, each of the index vertices may be represented as an entry in a secondary index.

In at least one example, a graph management system may maintain the secondary index (also referred to herein as "index") that corresponds to a particular attribute type. In particular, each entry within the index may be used to associated one or more attribute values for the attribute type with data instance vertices in the graph that qualify for the entry. Referring to the age example in a social network, an index may be generated that associates each age, or a set of ages, to users of the social network. For example, an entry in the index may indicate a first age range and link the first age to one or more unique identifiers for users associated with the first age range. Consequently, the age attribute for users may be used as an index to identify the unique identifiers associated with the age attribute.

Here, in addition to maintaining a secondary index, the graph management system may also maintain delta indexes that can be used to monitor changes in the graph as a function of time. In at least one implementation, the graph management system may generate the first complete index at time T0, the graph management system may then generate delta indexes that can be compiled or applied to the first index to generate an updated version of the complete index. The delta indexes may be generated periodically, may be generated based on a quantity of modifications to the graph, or may be based on some other factor. Consequently, the graph management system may generate the first index and generate subsequent indexes that can be combined to provide a current status of the graph in relation to the particular attribute type.

As the graph management system maintains the secondary index and the corresponding delta indexes, the graph management system may obtain a query associated with the attribute type. In response to the query, the graph management system may identify relevant data using the secondary index and delta indexes associated with the query and generate a response to the query using the data. In some implementations, the graph management system may compile a subset of the delta indexes that apply to the query with the complete secondary index to generate an updated index and generate a response with data from the updated index.

FIG. 1 illustrates a graph 100 with secondary index vertices according to an implementation. Graph 100 includes vertices 110-115, wherein vertices 110-113 correspond to a first vertex type 130, and wherein vertices 114-115 correspond to a second vertex type 131. Although the index vertices are depicted as explicitly added to the graph, it should be understood that the index vertices may just be an illustrative example of entries in an index for the graph.

In operation, a graph management system may generate graph 100 to manage data and provide search and query operations on the data. Graph 100 includes vertices 110-113 that are representative of data instance vertices that can be used represent various entities or data objects. These data objects may include users of a social network, employees of an organization, buildings or other physical elements, or some other data object. Each data instance vertex in vertices 110-113 may comprise a plurality of attributes corresponding to the object. For example, a user in a social network may include a unique identifier associated with the user, a location of the user, an age of the user, employment information for the user, or some other information for the user. To index vertices 110-113, the unique identifier may be used to distinguish each of the individual vertices, wherein the unique identifier may comprise a numerical value, a name, a combination of characters, or some other unique identifier for the data instance. Here, in addition to indexing vertices 110-113 using a unique identifier associated with each of the vertices, vertices 114-115 are added to enhance searches for information related to vertices 110-113.

Vertices 114-115 may be added to graph 100 based a request of an administrator associated with the graph, may be added based on query trends to graph 100, or may be added via any other mechanism. Vertices 114-115 may represent attributes that can be shared by two or more of data instance vertices 114-115. For example, in a social network, vertex type 131 may represent ages of the users in the social network (range or exact value), locations of the users in a social network, or some other attribute that can be shared by two or more users in the social network. In deploying vertices 114-115, the graph management system may determine attributes in the data instance vertices 110-113 related to the particular attribute type and generate vertices that correspond to the identified attributes. Thus, if the users of a social network resided in three locations, then three index vertices may be generated that correspond to the identified attributes. Once generated, edges may be used to connect the generated index vertices with data instance vertices that include the corresponding attribute.

Advantageously, by adding vertex type 131 to graph 100, the graph management system may use vertex type 131 to efficiently identify relevant data instance vertices for a query and use the data instance vertices to respond to the query. In some implementations, the queries to graph 100 may require the identification of one or more data instance vertices that include a particular attribute or fall into a set of attributes. Rather than traversing the unique identifiers associated with data instance vertices 110-113, the graph management system may identify one or more index vertices of vertex type 131 that correspond to the attribute (or set of attributes) in the query and use the index vertices to identify the relevant data instance vertices in graph 100. Once identified, the graph management system may respond to the query using information obtained from the identified data instance vertices.

In at least one implementation, in addition to or in place of adding the index vertices to the graph, the graph management system may generate an index that includes entries that are used to associate one or more attribute values with data instance vertices that qualify for the one or more attribute values. Referring to an example in graph 100, an entry in an index may include one or more values associated with vertex 114 and associated vertex 110-111 with the value.

Figure 2:
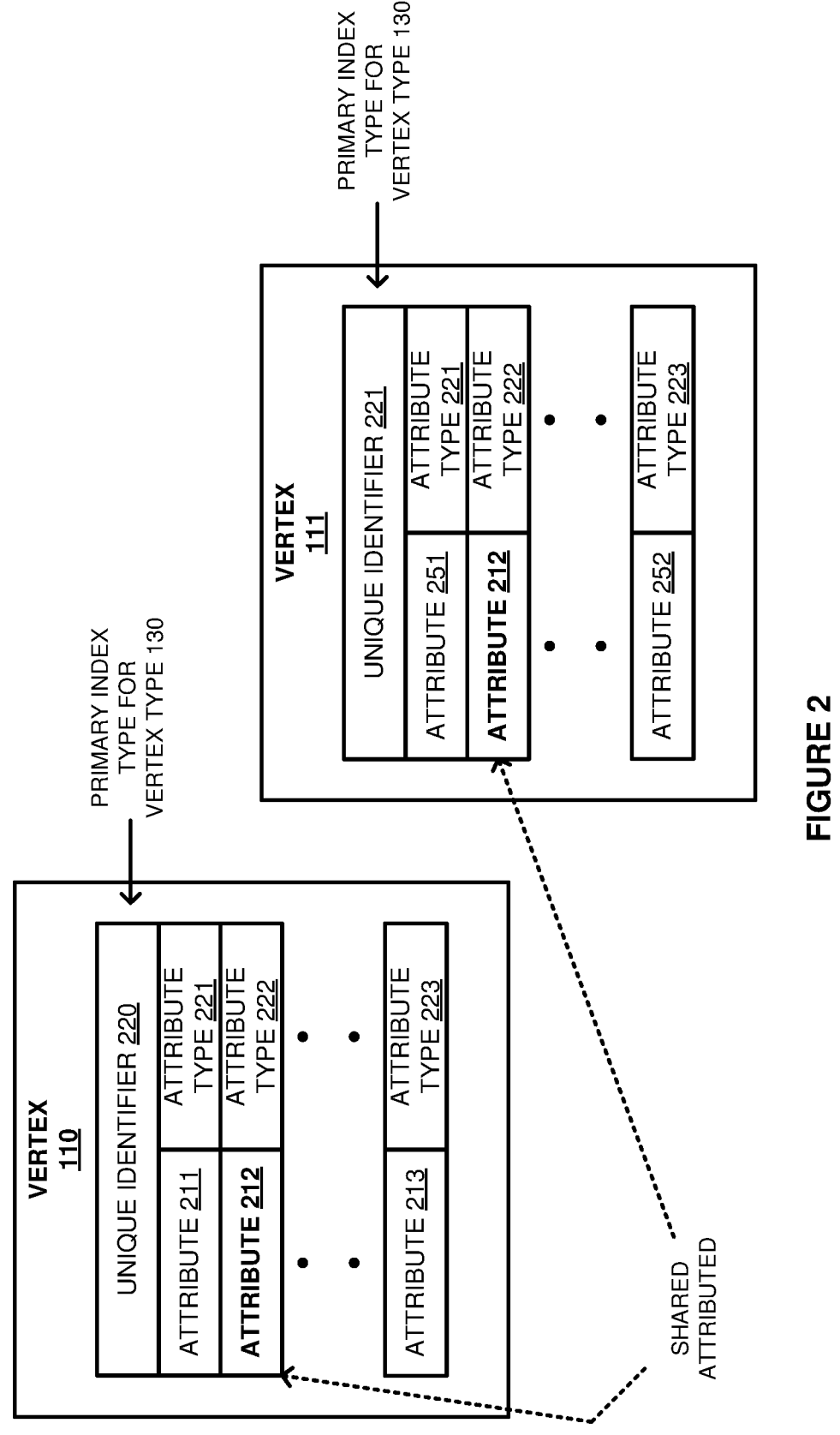
FIG. 2 illustrates an expanded view of vertex attributes according to an implementation.

FIG. 2 illustrates an expanded view of vertex attributes according to an implementation. In particular, FIG. 2 includes vertices 110-111 of vertex type 130 from graph 100 of FIG. 1. Vertices 110-111 are representative of data instance vertices from graph 100, wherein the data instance vertices may represent members of a social media network, employees of an organization, buildings, devices, or some other similar object or data element. Vertex 110 includes a unique identifier 220 (also referred to as a primary attribute) and attributes 211-213 that correspond to attribute types 220-223. Vertex 111 includes a unique identifier 221 and attributes 251, 212, and 252 that correspond to attribute types 221-223.

Here, vertices 110-111 are each indexed using a unique identifier, wherein the unique identifier can be used to distinguish the vertex from other vertices of the same vertex type. For example, if vertex type 130 (data instance vertices) represented employees of the organization, unique identifiers 220-221 may correspond to an employee number or some other value that is used to differentiate each of the employees of the organization. In addition to the unique identifier, each of the data instance vertices may include additional attributes that can provide additional information about the data instance. The additional attributes may be shared among one or more other data instance vertices of graph 100, wherein the attributes may correspond to ages, locations, occupations, or some other attribute that can be shared between multiple data instance vertices.

Although demonstrated in the example of FIG. 2 as including three attributes in addition to the unique identifier as part of the data instance, it should be understood that any number of attributes may be associated with a data instance. Further, while all the vertices may comprise the same attributes, at least a portion of the vertices may only contain a subset of the attributes. As a result, the index vertices may only be connected to data instance vertices that include a corresponding attribute.

Figure 3:
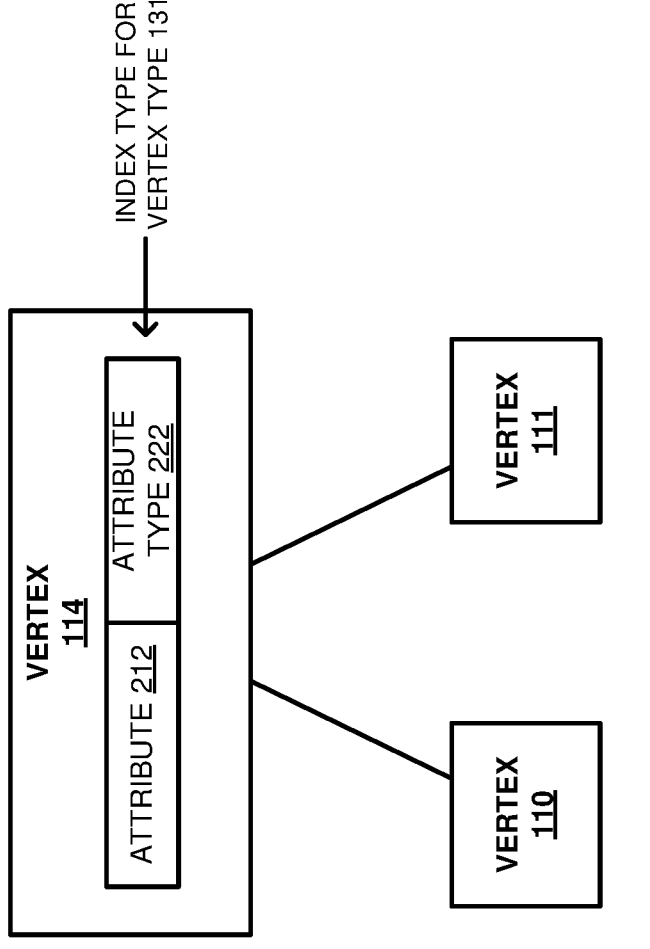
FIG. 3 illustrates an expanded view of an index vertex according to an implementation.

FIG. 3 illustrates an expanded view of an index vertex according to an implementation. In particular, FIG. 3 includes an index vertex 114 from graph 100 of FIG. 1 to provide additional indexing for graph 100. Vertex 114 is representative of a vertex of vertex type 131, wherein vertex type 131 may be used to provide additional indexing for vertices 110-113. In particular, while vertices of vertex type 130 are indexed using a first unique identifier associated with each of the vertices, vertex type 131 may be used to further index vertices of vertex type 130 using another attribute.

Here, vertex 114 is used to index vertices using attribute 212 of attribute type 222. Because vertices 110-111 include attribute 212 of attribute type 222, a graph management system may connect vertices 110-111 to vertex 114, such that vertex 114 can be used to assist in queries related to attribute 212 and attribute type 222. For example, if attribute type 222 corresponds to physical locations and attribute 212 corresponds to a particular location, then the graph management system may identify any of the data instance vertices that include the attribute for the particular location. Once identified, the index vertex can be coupled or associated with the corresponding data instance vertices.

In some implementations, in providing the additional indexing for a graph, the graph management system may, in addition to or in place of the index vertices for the graph, maintain a data structure, such as a table, array, or the like, that can be used to associate one or more attribute values with data instance vertices that qualify for the one or more attribute values. For example, using a social network example, a secondary index may be generated that corresponds to user ages, wherein each entry in the index may associate an age or set of ages to users that qualify for the age or set of ages. An example of the index data structure is provided below in FIG. 4. In at least one implementation, vertices 114-115 depicted as part of FIG. 1 may represent entries in the data structure, wherein an entry may associate one or more attribute values with data instance vertices that qualify for the value. Thus, rather than being added to the graph as vertices, each of vertices 114-115 may instead represent a single entry in a secondary index data structure.

FIG. 4 illustrates a secondary index 400 for a graph according to an implementation. Secondary index 400 is representative of a data structure that can be used by a graph management system to correlate attributes of a particular attribute type to data instance vertices in a graph. Secondary index 400 corresponds to attribute type 122 introduced in the vertex expanded view of FIG. 2. Secondary index 400 includes vertex 114, which corresponds to attribute 212, and is associated with vertices 110-111. Secondary index 400 further includes vertex 115, which corresponds to attribute 410, and is associated with vertex 113.

When a query is generated that corresponds to attribute type 122, rather than traversing each of the data instance vertex in the graph, the graph management system may use secondary index 400 to identify data instance vertices of vertices 110-113 that include a particular attribute. For example, when a query requests to identify all vertices associated with attribute 212, the graph management system may identify the entry in secondary index 400 that corresponds to attribute 212 and identify vertices 110-111 to respond to the query.

In some implementations, while an initial index may be generated for a particular attribute type, the graph management system may update information about the attribute type based on modifications to the graph. To update the information, rather than directly updating secondary index 400, the graph management system may generate delta indexes that correspond to a bitmap to secondary index 400. For example, if at an initial time secondary index 400 is generated (T0), then a delta index may be generated for modifications related to attribute type 122 for time T0-T1, where T1 may be a quantity of modifications, a period time, or some other period or interval. Once T1 is reached, a second delta index may be generated that corresponds to modifications related to attribute type 122 for a period T1-T2. The process of generating delta indexes may be repeated indefinitely or as defined by an administrator for the graph management system. In some implementations, the data from the various delta indexes may be compiled into secondary index 400 to generate an updated secondary index, wherein the updated index may include added vertices, removed vertices, attribute changes to vertices, or some other information from the delta indexes.

In at least one implementation, the secondary index 400 may be combined or compiled with one or more delta indexes based on a query to the graph. For example, a query to a graph may indicate a period of interest. Based on the period of interest, the graph management system may select relevant delta indexes, compile the relevant delta indexes to the secondary index, and generate a response based on the compilation. In generating the response, the graph management system may select entries that are relevant to the query from the updated index and use attributes of the identified vertices to provide a response to the query.

In some implementations, a secondary index may be distributed over multiple segments or computing systems. As a result, it may be necessary to quickly identify which of the computing systems contain data relevant to a particular query. To support this functionality, each computing system in a graph management system may use a bloom filter to determine whether data relevant to a particular query may be located on the computing system or is definitely not located on the computing system. In particular, a bloom filter is a space-efficient probabilistic data structure that is used to test whether an element is a member of a set. In some examples, each of the computing systems may maintain a bloom filter that can identify whether data related to an attribute value is located in the computing system. To generate the bloom filter, each computing system may hash the index attribute values in the index portion for that computing system. Thus, when a query is generated for a particular attribute value, the computing system may check its corresponding bloom filter to determine whether that value is possibly on the computing system. If the value is not located on the computing system, then the computing system may ignore the query. However, if the value (or values) is located on the computing system, then the computing system may identify relevant data about the value, such as data instance vertices that correspond to the value or values. The data from the various computing systems may then be compiled to generate a response to the query.

For example, a query for a social network may attempt to identify all users that are located in London. In response to the query, the graph management system may determine which computing systems may include information about the desired location attribute, wherein the determination may be based on a bloom filter generated from an index portion for the user location attributes at the computing system. For the computing systems that can include the corresponding attribute value based on the bloom filter, the computing systems may gather data (if any) about the data instance vertices that correspond to the attribute value and compile the data to assist in a response to the query, such as a list of users (name or identifier) located in London. In some examples, the compiling of data from the different computing systems may occur at a separate computing system, however, the compiling may occur at one of the computing systems maintaining the graph.

FIG. 5 illustrates an operation 500 of a graph management system to maintain a secondary index according to an implementation. The processes of operation 500 are referenced parenthetically in the paragraphs that follow with reference to elements from graph 100 described in FIGS. 1-4.

As depicted in FIG. 5, operation 500 generates (501) an index corresponding to attributes of an attribute type identified in vertices of a graph, wherein the vertices each comprise a unique identifier and one or more attributes corresponding to one or more attribute types, and wherein each entry in the index associates at least one attribute value with one or more of the vertices with an attribute that qualifies for the entry. Referring to an example of FIG. 1, each vertex of vertices 110-113 is representative of a data instance vertex, wherein each vertex may include a unique identifier and one or more additional attributes. For example, for a social network, each user of the social network may be allocated a unique identifier, but also be provided with additional attributes, such as name, occupation, age, location, or some other attribute. To provide additional indexing to a graph over the unique identifiers, a graph management system may identify an attribute type of interest and generate a new index that corresponds to the attribute type of interest. The attribute type of interest may be specified by an administrator associated with the graph, may be determined based on query trends to the graph management system, or may be determined in any other manner. Once the attribute type is identified, each entry in the index may include one or more attribute values and associate the one or more attribute values to data instance vertices that qualify for the values. For example, a new index may be generated that corresponds to ages of users in a social network. The graph management system may generate entries that each associate one or more attribute values to one or more data instance vertices that qualify for the entry. Thus, because vertices 110-111 share a common attribute 212, vertices 110-111 may be associated to the same entry. Although demonstrated with a single attribute per entry, it should be understood that multiple attributes or a range of attributes may be entered in each entry. For example, using ages as an example, a range of ages may be used for each of the entries and the users that qualify for the age range may be identified in the entry. The values for each entry may be provided by an administrator, may be determined based on query trends to the graph management system, or may be determined in any other manner.

In addition to generating the index, operation 500 further generates (502) one or more delta indexes associated with the index based on one or more modifications to the graph. The modifications may comprise the addition of data instance vertices, the deletion of data instance vertices, the modification to an existing vertex, or some other modification to the graph. In at least one implementation, each of the delta indexes may represent a different period, wherein the period may comprise a period of time, such as an hour, a day, or some other period, the period may comprise a quantity of modifications. As an example, when the index is generated, the graph management system may identify a first timestamp (TO). The graph management system may then generate a first new delta index that corresponds to the period from T0-T1, and a second new delta index from time T1-T2. The periods may comprise time periods, may comprise a quantity of modifications to the graph, or may comprise some other interval. In some implementations, the delta indexes may comprise bitmaps that are used to indicate additions, deletions, and other modifications associated with the index. The delta indexes may be applied or compiled with the original index to generate a desired index for responding to queries. In some examples, the delta indexes may indicate additions and deletions to the graph. In other examples, only the added data may be included in the delta index, requiring the graph management system to delete the data as part of a query based on deletions that occurred for the graph.

As the delta indexes are maintained, the graph management system further obtains (503) a query to the graph associated with the attribute type and generates (504) a response to the query based at least on the index and at least one delta index of the one or more delta indexes. The query to the graph may be generated by a user of the graph management system, may be generated by an automated operation, or may be generated in any other similar manner. The query may be used to identify data instance vertices associated with a particular attribute, shortest path queries, radius queries, or some other query to the graph. In response to the query, the graph management system may determine whether the query corresponds to an attribute type maintained as part of the secondary index and respond to the query using the secondary index (and associated delta indexes). In at least one implementation, the query may provide a timestamp or period of interest for the graph. As a result, the graph management system may combine delta indexes and the original index to support the timestamp or period of interest.

In some implementations, a graph may be distributed across multiple segments or portions on one or more computing systems. As a result, the index may be required to be updated based on changes at each of the segments. In some examples, relevant portions of the index may be updated for only relevant computing systems or segments. In other examples, each computing system or segment may maintain a complete version of the index. In at least one implementation, each of the computing systems may maintain a bloom filter to determine whether relevant data, such as vertices, to a query are located on the computing system (e.g., in an index). A bloom filter is used to determine whether a relevant data object may be in the set or is definitely not in the available set. Only when the relevant content is located in the computing system is the computing system required to provide any information to respond to the query as part of the graph management system. As a result, the graph management system may aggregate the information from the various segments to generate a response.

Figure 6A:
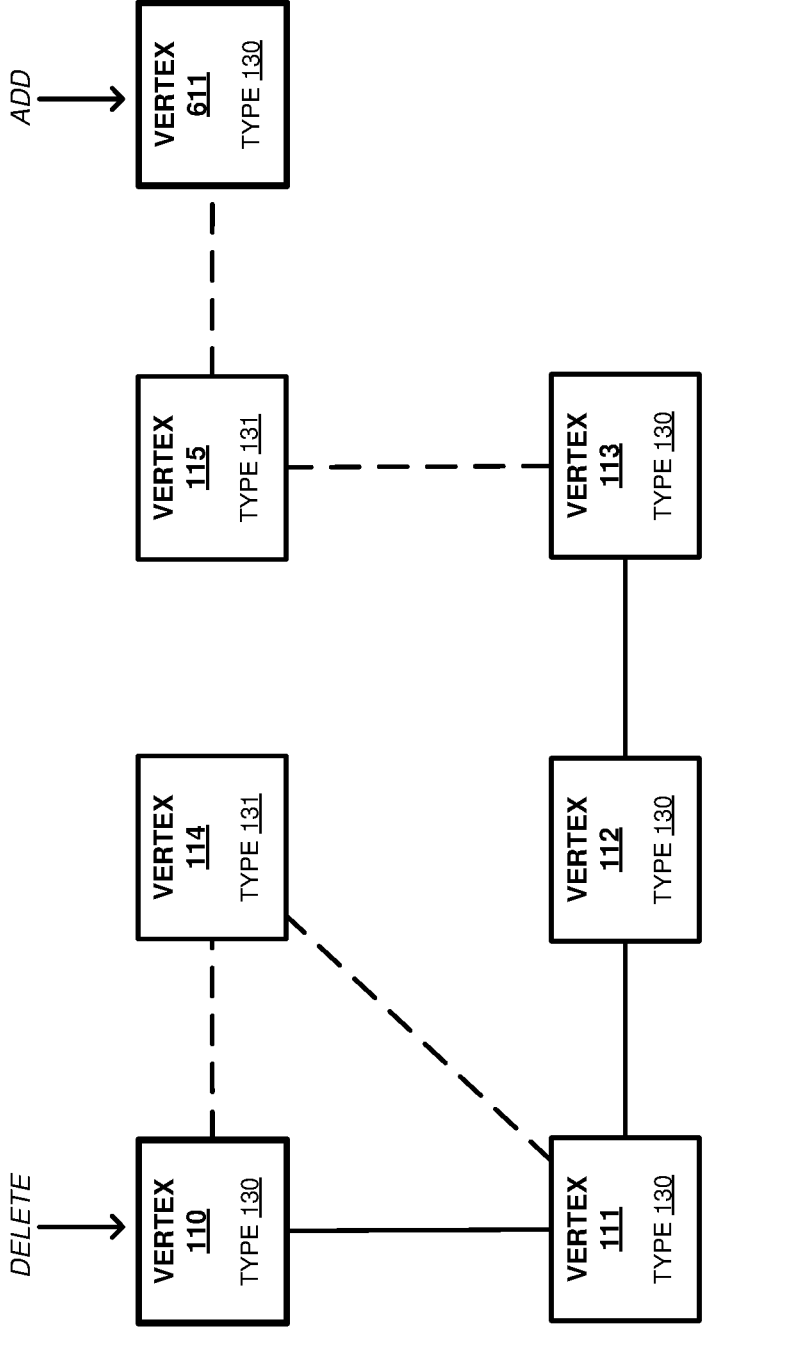
Figure 6B:
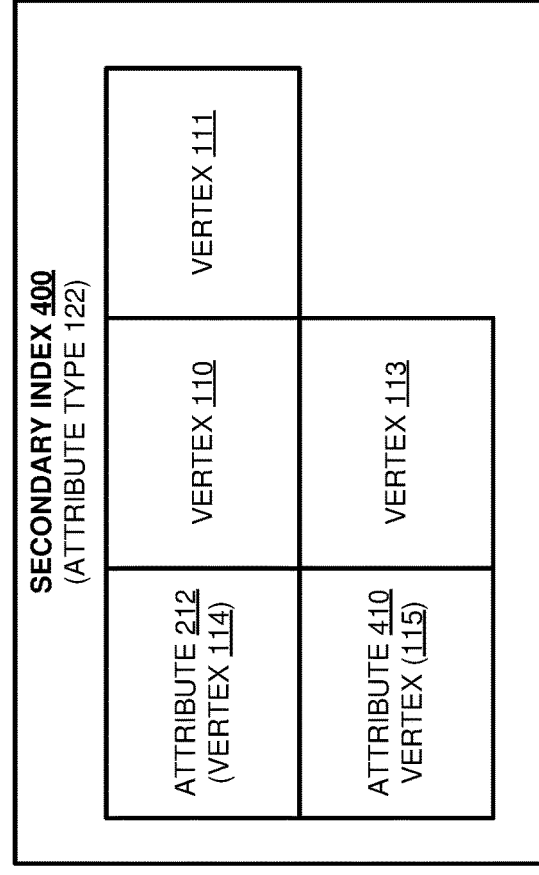

FIGS. 6A-6C illustrate modifications in a graph and a secondary index according to an implementation. Referring first to FIG. 6A, FIG. 6A includes vertices 110-115 of graph 100 from FIG. 1 and further includes a new vertex 611 that is coupled to vertex 115. As described herein, a graph management system may generate a secondary index that can be used to index data index vertices using an alternative attribute from the unique identifier. The attribute type for the secondary index may be defined by an administrator associated with the graph, may be defined based on query trends to the graph, or may be based on some other factor. When an attribute type is identified, the graph management system may generate an original or first instance of an index for the attribute, wherein the index associates an attribute value or values with one or more data instance vertices that qualify for the value or values.

Here, after generating the first version of the index, modifications are made to the graph to delete vertex 110 and add vertex 611. The modifications may then be reflected in a delta index that can be used to monitor changes in the graph as a function of time. In some implementations, the delta index may include additions and deletions to the graph, however, it should be understood that the delta index may only include additions when desired. Once the delta index is generated, the delta index may be applied or compiled with the original index to reflect a current status of the attribute type or the status of the attribute type at some other time period. The delta indexes may be generated periodically, based on a quantity of modifications to the graph, or at some other interval.

Turning to FIG. 6B, FIG. 6B includes secondary index 400 from FIG. 4 and further includes delta index 610. Delta index 610 includes entries for vertex 114 and vertex 115, wherein vertex 114 is associated with vertex 111 that was deleted from the graph, and wherein vertex 115 is associated with vertex 611 that was added to the graph. In some implementations, delta index 610 for attribute type 122 may comprise a bitmap, wherein the bitmap may indicate where data should be added to or removed from secondary index 400 and what data should be included or removed from the index. In at least one implementation, delta index 610 may represent modifications to graph 100 that occurred during a first time period. Once the time period is completed, the graph management system may generate a subsequent delta index that corresponds to modifications over the next time period. The graph management system may then compile one or more of the delta indexes to respond to a query or update secondary index 400.

In some implementations, secondary index 400 may be updated at various intervals by combining the one or more delta indexes. The original secondary index may be kept in some examples or may be replaced. For example, for every one-week period, delta indexes for the one-week period may be applied to a first version of an index to generate a second version of the index. The first version of the index may be kept in some examples or may be deleted in some examples.

In other implementations, the compiling of the delta indexes may occur in response to a query, wherein the query may define a time period of interest and a relation to attribute type 122. Based on the time period of interest, the graph management system may compile relevant delta indexes with a first version of the secondary index and generate a response to the query based at least in part on the compiled indexes.

FIG. 6C demonstrates a compilation of a secondary index with a delta index according to an example. In particular, FIG. 6C includes updated secondary index 690 that comprises a compilation of secondary index 400 and delta index 610. Updated secondary index 690 may be generated in response to a query, in response to the expiration of a period of time, or some other triggering event. Here, updated secondary index 690 removes vertex 110 in association with vertex 114, while vertex 611 is added in relation to vertex 115. Although the updated index and the updated graph demonstrate the addition and removal of entire vertices from a graph, it should be understood that similar operations may be performed based on changes to attributes associated with the vertex, such as the removal of an attribute, a change of an attribute, an addition of an attribute, or some other modification. For example, if vertex 111 removed the attribute that qualified the vertex to be associated with vertex 114, then vertex 111 may be removed from the index.

In some implementations, a graph may be distributed across multiple computing systems, wherein each of the computing systems may maintain a portion or segment of a secondary index that is relevant to the graph. When a query corresponds to the attribute type associated with the secondary index, each computing system with information corresponding to the query may be used to compile the required data and respond to the query. Thus, any query to the graph may include identifying computing systems, or segments that can comprise portions of a computing system, that include relevant data attributes to the query. For example, if a graph management system receives a query for users of a social network associated with a particular age range, the graph management system may identify computing systems and/or segments with data associated with the age range and compile the requisite data from the corresponding systems or segments. Once compiled, the data may be used to respond to the query, such as providing a list of unique identifiers associated with the users associated with the age range, a quantity of users within the age range, or some other response to the query. Advantageously, rather than using a primary index associated with the unique identifiers for the vertices, the graph management system may use the secondary index for the vertices to identify vertices relevant to a particular attribute type. Once the vertices are identified, the graph management system may use the vertices to respond to the query. Thus, referring back to the range of ages for users in a social network, when data vertices are identified that correspond to the range of ages, the graph management system may use relevant information from the identified vertices to generate a response, such names of the users, locations of the users, or some other attribute(s) for the identified users.

Figure 7:
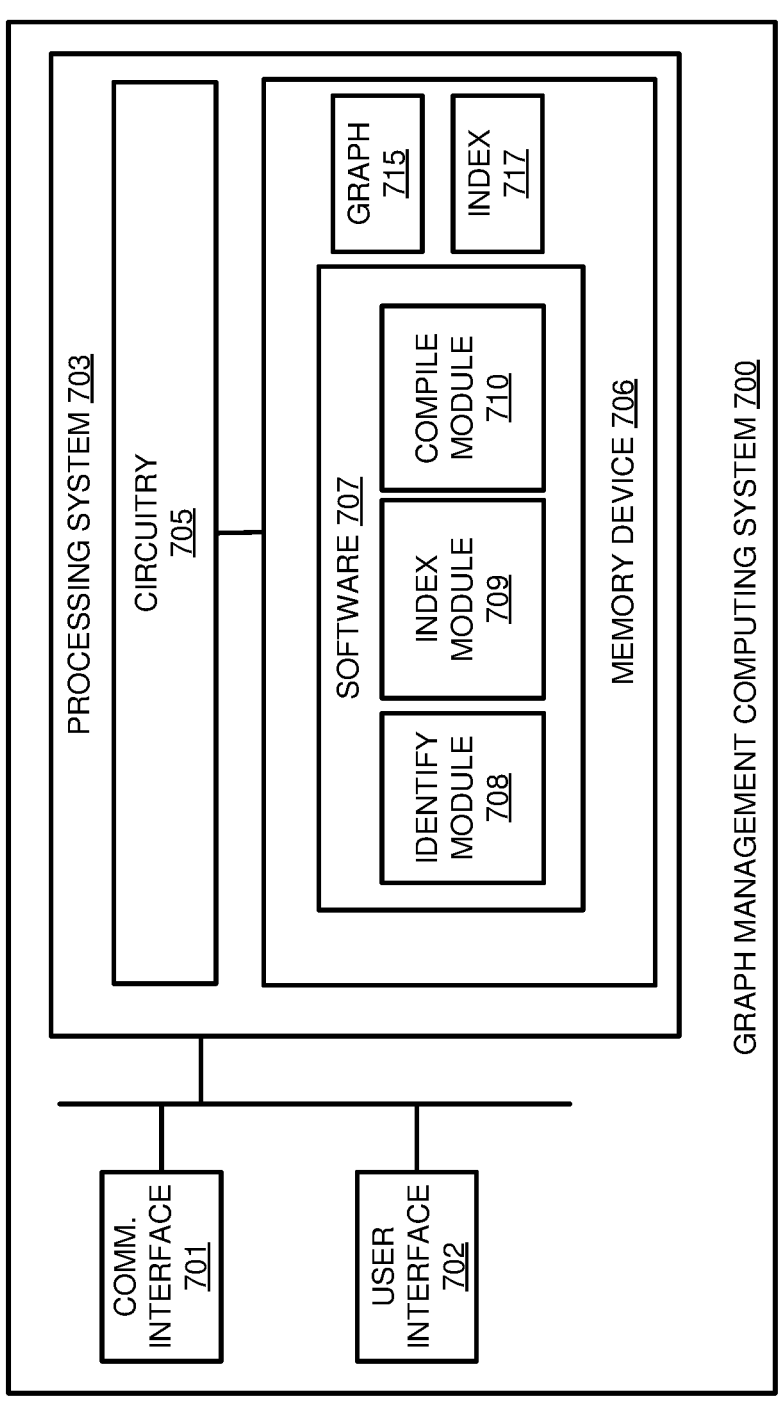
FIG. 7 illustrates a graph management computing system according to an implementation.

FIG. 7 illustrates a graph management computing system 700 according to an implementation. Computing system 700 is representative of any computing system or systems with which the various operational architectures, processes, scenarios, and sequences disclosed herein for a graph management system may be implemented. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format-including combinations thereof. In at least one implementation, communication interface 701 may be configured to communicate with one or more client computing systems, wherein the communications may be used to define queries to graph 715 or provide a response to the queries to the client system User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus-including combinations thereof. User interface 702 may be omitted in some examples.

Processing circuitry 705 comprises microprocessor and other circuitry that retrieves and executes operating software 707 from memory device 706. Memory device 706 may include volatile and nonvolatile, removable and non-removable media implemented in any method or technology for storage of information, such as computer readable instructions, data structures, program modules, or other data. Memory device 706 may be implemented as a single storage device but may also be implemented across multiple storage devices or sub-systems. Memory device 706 may comprise additional elements, such as a controller to read operating software 707 and data for graph 715 and index 717. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 705 is typically mounted on a circuit board that may also hold memory device 706 and portions of communication interface 701 and user interface 702. Operating software 707 comprises computer programs, firmware, or some other form of machine-readable program instructions. Operating software 707 includes identify module 708, index module 709, and compile module 710, although any number of software modules may provide a similar operation. Operating software 707 may further include an operating system, utilities, drivers, network interfaces, applications, or some other type of software. When executed by processing circuitry 705, operating software 707 directs processing system 703 to operate computing system 700 as described herein.

In one implementation, identify module 708 directs processing system 703 to identify an event to generate a secondary index for data instance vertices in graph 715. The event may comprise a user request for the secondary index, an event based on query trends to graph 715, or some other event. For example, identify module 708 may determine when requests to the graph 715 satisfy criteria associated with a particular attribute type (e.g., frequency of requests for a particular attribute type, total quantity of requests associated with an attribute type, or some other criteria). In response to the event, index module 709 directs processing system 703 to generate index 717 corresponding to attributes of the attribute type identified in vertices of graph 715, wherein the vertices each comprise a unique identifier and one or more attributes corresponding to one or more attribute types, and wherein each entry in the index associates at least one attribute value with one or more of the vertices with an attribute that qualifies for the entry. For example, index 717 may be used to index user location for users in a social network. To generate index 717, index module 709 may identify locations associated with the users and generate entries that correspond to the locations. In some examples, the entries may include a single location or may include multiple locations, wherein the multiple locations may be defined by an administrator associated with the graph or may be defined based on query trends to graph 715 (e.g., requests associated with a region with multiple locations). Once the locations are identified for index 717, index module 709 may associate data instance vertices to various entries.

In addition to generating an initial index, index module 709 further directs processing system 703 to generate one or more delta indexes associated with the index based on modifications to the graph. The modifications to the graph may comprise additions or deletions of vertices, additions or deletions of attributes to an existing vertex, or some other modification. In some implementations, the delta indexes may correspond to a period, wherein the period may comprise a period of time, a quantity of modifications, or some other period. Once the period is complete, computing system 700 may generate a new delta index for the next period. For example, a first delta index may be used to identify modifications associated with the attribute type for a first ten-minute period, while a second delta index may be used to identify modifications associated with the attribute type for a second ten-minute period. In some examples, the delta index may maintain information about attributes added and deleted from graph 715, however, the delta index may only maintain additions in some examples, while deletions may be incorporated as required during a compilation requirement for index 717 in association with the delta indexes. In at least one implementation, the delta indexes may correspond to bitmaps capable of identifying locations for changes in index 717 and the changes to be made in those locations.

As the delta indexes are generated in conjunction with index 717, compile module 710 further directs processing system 703 to obtain a query to the graph associated with the attribute type and generate a response to the query based at least on the index and at least one of delta index of the one or more delta indexes. In some implementations, compile module 710 may identify a period of interest and identify delta indexes that correspond to the period of interest. Once identified, compile module 710 may compile the identified delta indexes with index 717 to provide the required data associated with the request. In some examples, the compiling of the delta indexes with index 717 may be performed prior to a query, however, it should be understood that the compiling may occur in response to the query.

As an illustrative example, a query may request a total quantity of data instance vertices in graph 715 that include a specific attribute. In response to the request, computing system 700 may identify the attribute type associated with the attribute and identify an index for the attribute. Further, computing system 700 may identify a time period of interest associated with the request and identify delta indexes associated with the time period of interest. The delta indexes may then be used in conjunction with, or compiled with, the original index to respond to the query. In some implementations, when delta indexes are applied or compiled with an original index to generate an updated index, the updated index may be stored, and the delta indexes deleted. In other implementations, the original index may be kept, and the updated index may be stored or deleted based on preferences for the index and the graph management system.

Although demonstrated in the previous examples as using a single secondary index to respond to a query, it should be understood that any number of secondary indexes may be maintained and used to respond to queries associated with graph 715. For example, if a query included a request for all data instance vertices associated with two attributes of different attribute types, an index for both of the attribute types may be used to identify data instance vertices with the two attributes. Once identified, a response may be generated at least in part on the identified vertices, wherein the summary may indicate information associated with attributes in the identified vertices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
  generating an index for searching vertices in a graph, wherein the vertices each comprise a unique identifier and one or more attributes that each correspond to an attribute type of a plurality of attribute types, wherein the index corresponds to a first attribute type of the plurality of attribute types, wherein each entry of a plurality of entries in the index associates a set of attribute values for the first attribute type with one or more of the unique identifiers for one or more of the vertices having the set of attribute values for the entry, and wherein at least one entry of the plurality of entries comprises at least two of the unique identifiers corresponding to at least two of the vertices;
  generating one or more delta indexes, wherein each of the one or more delta indexes comprises a delta entry identifying one or more modifications to the graph made during a specific time period, and wherein the delta entry corresponds to one of the plurality of entries in the index;
  obtaining a query to the graph associated with the first attribute type, wherein the query identifies a time period of interest;
  identifying, based on the time period of interest in the query, a first delta index from the one or more delta indexes, the first delta index having the specific time period corresponding to the time period of interest; and
  generating a response to the query based at least on the index and the first delta index.

2. The method of claim 1, wherein the one or more modifications comprise one or more additions or deletions in the graph.

3. The method of claim 1, wherein the one or more attributes for each of the vertices comprises a first attribute of the first attribute type.

4. The method of claim 1 further comprising maintaining a second index to index the graph based on the unique identifiers for the vertices in the graph.

5. The method of claim 1, wherein generating the response to the query-comprises:
  compiling the index and the first delta index to generate an updated index; and
  generating a response to the query based at least on the updated index.

6. The method of claim 1, wherein the set of attribute values for each entry in the index comprises a range of attribute values.

7. The method of claim 1, wherein generating the one or more delta indexes comprises:
  generating the first delta index, wherein the specific time period of the first delta index comprises a first period; and
  generating one or more additional delta indexes, each having the specific time period comprising an additional period following the first period.

8. The method of claim 7, further comprising:
  determining that the query corresponds to the attribute type, wherein the generating the response to the query is in response to determining that the query corresponds to the attribute type.

9. The method of claim 1 further comprising compiling the one or more delta indexes with the index to generate a new index.

10. A computing system comprising:
  a processor; and
  a memory device operably coupled to the processor and having stored thereon program instructions that, upon execution by the processor, cause the processor to:
    generate an index for searching vertices in a graph, wherein the vertices each comprise a unique identifier and one or more attributes that each correspond to an attribute type of a plurality of attribute types, wherein the index corresponds to a first attribute type of the plurality of attribute types, wherein each entry of a plurality of entries in the index associates a set of attribute values for the first attribute type with one or more of the unique identifiers for one or more of the vertices having the set of attribute values for the entry, and wherein at least one entry of the plurality of entries comprises at least two of the unique identifiers corresponding to at least two of the vertices;
    generate one or more delta indexes, wherein each of the one or more delta indexes comprises a delta entry identifying one or more modifications to the graph made during a specific time period, and wherein the delta entry corresponds to one of the plurality of entries in the index;
    obtain a query to the graph associated with the first attribute type, wherein the query identifies a time period of interest;
    identify, based on the time period of interest in the query, a first delta index from the one or more delta indexes, the first delta index having the specific time period corresponding to the time period of interest; and
    generate a response to the query based at least on the index and the first delta index.

11. The computing system of claim 10, wherein the one or more modifications comprise one or more additions or deletions in the graph.

12. The computing system of claim 10, wherein the one or more attributes for each of the vertices comprises a first attribute of the first attribute type.

13. The computing system of claim 10, wherein the program instructions further direct the processor to maintain a second index to index the graph based on the unique identifiers for the vertices in the graph.

14. The computing system of claim 10, wherein generating a response to the query comprises:
  compiling the index and the first delta index to generate an updated index; and
  generating a response to the query based at least on the updated index.

15. The computing system of claim 10, wherein the set of attribute values for each entry in the index comprises a range of attribute values.

16. The computing system of claim 10, wherein generating the one or more delta indexes associated with the index based on the one or more modifications to the graph comprises:

generating the first delta index, wherein the specific time period of the first delta index comprises a first period; and generating one or more additional delta indexes, each having the specific time period comprising an additional period following the first period.

17. The computing system of claim 10, wherein the program instructions further direct the processor to:

determine that the query corresponds to the attribute type, wherein the generating the response to the query is in response to determining that the query corresponds to the attribute type.

18. The computing system of claim 10, wherein the program instructions further direct the processor to compile the one or more delta indexes with the index to generate a new index.

* * * * *